(12) United States Patent
Cherubini et al.

(10) Patent No.: US 7,382,712 B2
(45) Date of Patent: Jun. 3, 2008

(54) METHOD FOR POSITIONING A SCANNING PROBE ON A TARGET TRACK OF A MULTI-TRACK STORAGE MEDIUM, STORAGE DEVICE, SCANNING DEVICE, AND STORAGE MEDIUM

(75) Inventors: Giovanni Cherubini, Rueschlikon (CH); Evangelos S. Eleftheriou, Zurich (CH); Charalampos Pozidis, Gattikon (CH); Sri M. Sri-Jayantha, Ossining, NY (US)

(73) Assignee: International Business Machines Corporation, Armonk, NY (US)

(*) Notice: Subject to any disclaimer, the term of this patent is extended or adjusted under 35 U.S.C. 154(b) by 596 days.

(21) Appl. No.: 10/920,940

(22) Filed: Aug. 18, 2004

(65) Prior Publication Data

US 2006/0039250 A1 Feb. 23, 2006

(51) Int. Cl.
*G11B 7/00* (2006.01)
(52) U.S. Cl. ...................................... 369/126
(58) Field of Classification Search ................ 369/126, 369/44.11, 44.12, 275.3, 44.27, 44.28, 44.29, 369/47.27, 100, 44.26
See application file for complete search history.

(56) References Cited

U.S. PATENT DOCUMENTS

| | | | | |
|---|---|---|---|---|
| 5,144,581 A * | 9/1992 | Toda et al. | ................... | 369/126 |
| 5,974,023 A * | 10/1999 | Miyauchi et al. | ......... | 369/59.25 |
| 6,195,313 B1 * | 2/2001 | Seki et al. | ............... | 369/44.11 |
| 6,665,239 B1 * | 12/2003 | Takahashi et al. | ....... | 369/44.23 |
| 7,054,239 B1 * | 5/2006 | Mitsuoka et al. | ........ | 369/44.26 |
| 7,082,082 B2 * | 7/2006 | Tomita | ........................ | 369/14 |
| 7,221,639 B2 * | 5/2007 | Onoe et al. | .................. | 369/126 |

* cited by examiner

*Primary Examiner*—Nabil Z Hindi
(74) *Attorney, Agent, or Firm*—George A. Willinghan; August Law Group, LLC

(57) ABSTRACT

A method for settling on a target track of a servo system in a storage device (110) comprising a scanning probe (e.g., a scanning probe array system (124)) is disclosed, as well as a corresponding storage device (110). A data format is employed for the data stored in servo fields (18), consisting mainly of a preamble for assisting the settle process.

22 Claims, 2 Drawing Sheets

METHOD FOR POSITIONING A SCANNING PROBE ON A TARGET TRACK OF A MULTI-TRACK STORAGE MEDIUM, STORAGE DEVICE, SCANNING DEVICE, AND STORAGE MEDIUM

FIELD OF THE INVENTION

This invention relates to a storage device comprising a scanning probe, or probe array, a scanning device, a storage medium, and to a method for positioning a scanning probe on a target track of a multi-track storage medium.

BACKGROUND OF THE INVENTION

In the field of this invention an example of a storage device comprising a plurality of scanning probes is a micro-electro-mechanical system (MEMS) based scanning-probe data-storage system. A typical example of such a probe-based storage device that uses thermomechanical writing and thermomechanical or thermal reading by using heater cantilevers is disclosed in Vettiger et al., "The 'Millipede'—More than one Thousand Tips for Future AFM Data-Storage," IBM J. Res. Develop., Vol. 44, No. 3, pp. 323-340 (2000); and E. Eleftheriou et al., "Millipede-a MEMS-based scanning-probe data-storage system," IEEE Trans. Magn., vol. 39, pp. 938-945 (2003). Such a system is also disclosed in U.S. Pat. No. 5,835,477 issued 10 Nov. 1998 to Binnig, G. K. et al.

A main function of a servo system of such storage device is to maintain the position of a read/write probe on the centre of a track during read/write operation. This is known as a track follow mode. Track following controls the fine positioning of the read/write probe in the cross-track direction, and maintains constant the velocity of the scanner in the on-track direction, and is critical for reliable storage and retrieval of user data. It is typically performed in a feedback loop driven by a position error signal (PES), which indicates the deviation of the current position from the track centre line (TCL). Position error signal generation for servo control of storage devices comprising arrays of scanning probes has been addressed in Pozidis, H. et al., "Tracking in the Millipede System," IBM Research Report RZ 3432, July 2002, as well as EP1385161A2 assigned to the Applicant. It was argued that the use of dedicated storage fields for storing servo information is advantageous in terms of area overhead compared to the alternative of sectored servo schemes, as described for example in Sacks, A. H., "Position signal generation in magnetic disk drives", Ph.D. Thesis, Carnegie Mellon University, 1995, especially as the number of scanning probes increases. Formatting of servo data stored on servo fields was also addressed, and a method for decoding the servo data into position error signals has been specified.

However, prior to fine tuning a scanning probe to the centreline of a track, the scanning probe first has to be positioned on the right track of a multi-track storage medium. Consequently, in such a storage device it is a challenge to locate the precise track where information is to be written or from which information is to be read.

As during such positioning process no reading or writing of user data may be performed, the duration of these modes has to be kept to a minimum.

A need therefore exists for a method and apparatus allowing fast and accurate settling on a target track in a storage or scanning device comprising a scanning probe.

STATEMENT OF INVENTION

In accordance with a first aspect of the present invention there is provided a method for positioning a scanning probe on a target track of a multi-track storage medium in a storage device.

According to this method, a track identifier is read from the track the scanning probe is currently positioned on. Preferably, the scanning probe itself reads information from the track and, thus, reads the track identifier. Cross-track information is determined by way of comparing a target track identifier to the read track identifier. The scanning probe is (re-)positioned based on the cross-track information.

Preferably, the storage medium is organized in tracks the scanning probe follows when reading or writing data on/from the storage medium. Information stored on the storage medium is thus typically stored in tracks. For supporting a mode for positioning a scanning probe on the right track, a track itself comprises a track identifier. A track identifier is preferably embodied as a mark pattern identifying the respective track.

By way of comparing such read track identifier to a target track identifier which target track identifier is typically given and indicates the track the scanning probe has to be positioned for e.g. reading or writing purposes cross track information can be derived. Cross track information is preferably the delta between the read track identifier and the target track identifier and thus can indicate the distance in units of tracks in cross track direction between the target track and the track the scanning probe is currently positioned on. Preferably, the tracks in a scanning probe storage device are straight tracks aligned in parallel to each other, several tracks forming together a rectangular storage field. Cross track information can thus indicate the deviation of the current track from the target track, e.g. by providing cross track information with a positive value if the target track is located above the track currently scanned, and e.g. by providing cross track information with a negative value if the target track is located above the track currently scanned.

The cross track information can be used as an input signal to a scanner which scanner is responsible for moving the scanning probe along a y-axis which y-axis is vertical to an x-axis, provided the tracks are aligned in parallel to the x-axis which means that the scanning direction is in parallel to the x-axis. The scanner is preferably also responsible for moving the scanning probe along the x-axis. Any movement related to the scanning probe is understood as movement of the scanning probe relative to the storage medium.

Once the cross track information is determined the scanning probe is repositioned if the cross track information indicates that the track currently scanned is different to the target track. Herewith, the scanning probe can directly be positioned on the target track, which can be verified by subsequent reading of the track identifier stored on the target track. However, there might be constraints in positioning the scanning probe on a new track: Such constraints might be defined in a maximum number of tracks for the scanning probe to jump across. Thus, settling the scanning probe on the target track can also be embodied as iterative process of the method according to claim 1 thereby requiring more repositioning steps for the scanning probe to jump from the current track towards the target track, including landing on intermediate tracks between the current track and the target track.

The target track is preferably given by some control unit of the storage device which control unit is embodied e.g. for writing and/or reading information on/from the storage medium and thus e.g. knowing where to find information to be read on the storage medium and/or where to write information on the storage medium.

In order to identify a track identifier pattern on a track, it is preferred to have means available for identifying the beginning of a track identifier pattern.

Such means can be a specific synchronization pattern for identifying the beginning of the track identifier pattern.

There are some steps identified that reflect preferred embodiments which steps are preferably performed before a track identifier is read from a track of the storage medium: Preferably, a velocity of the scanning probe is adjusted to a desired velocity. The velocity of the scanning probe is understood as velocity relative to the storage medium. The desired velocity reflects an optimum velocity for performing reliable reading/writing operations on the one hand and achieving a high reading/writing rate on the other hand. This step can be performed by a velocity adjustment entity.

According to another embodiment, an amplitude of a read back signal received when reading information from the storage medium is identified by an amplitude identification entity. It can be crucial to know the amplitude of a read back signal for e.g. classifying information read from the storage medium. By means of such amplitude, thresholds can be determined for distinguishing e.g. information representing a "1" and information representing a "0" in a read back signal provided the read patterns are binary coded.

According to another embodiment, a phase of pulses is determined by a phase determination entity prior to reading a track identifier. Pulses are typically used in a storage probe device for one or more of reading and writing and erasing information on/from the storage medium. In order to trigger a reading or writing pulse at the right moment—in case of reading e.g. when the scanning probe is currently located on a mark representing data—the phase or timing of such pulses is determined before reading information from the storage medium. Such timing information can continuously be updated by appropriate measures. Such timing adjustment can also include selecting of one or more pulses out of a series of over-sampling pulses which selected pulses are then applied for reading or writing purposes.

All the above entities can be embodied as software or as hardware or as a combination of software and hardware.

The following embodiments reflect the way the scanning probe is positioned according to the cross-track information as determined above. In particular, the scanning probe can remain on the current track in case the cross track information does not indicate a jump to another track of the storage medium. The scanning probe is then already positioned on the target track. Insofar, the term positioning the scanning probe based on the cross track information also includes remaining on the current track if the cross track information indicates so. However, if the cross track information indicates a track-wise deviation from the target track the scanning probe is repositioned on another track than the current track. This track can be the target track, or can be another track more close to the target track in case a jump directly on the target track can not be performed for any reason.

According to a very preferred embodiment of the present invention, each track comprises multiple track identifiers, each track identifier of a track identifying this particular track. By means of preparing the tracks this way, the method of positioning a scanning probe on a target track can be repeated many times while continuing scanning in scanning direction. In case only one track identifier is stored per track, the scanning probe would have to be repositioned on the beginning of a new track in order to identify the track identifier of this new track. As consequence, the scanner in x-direction would have to stop and go back to a x-position representing the beginning of a track. Instead, when having multiple track identifiers stored in each track the scanner can continue driving the scanning probe in scanning direction which is also referred to as x-direction in the following. Then the scanning probe has only to be shifted along the y-axis, resulting in a diagonal jump due to the maintained movement of the scanning probe in x-direction. Preferably, every track identifier pattern of a track is initiated by a corresponding synchronization pattern for identifying the beginning of a subsequent track identifier pattern. In between a track identifier pattern and a synchronization pattern identifying the beginning of the subsequent track identifier pattern, there is preferably arranged a buffer pattern. When maintaining scanning velocity in x-direction, a scanning probe will not land on the same x position where started from when jumping to another track. Without the buffer pattern introduced above the scanning probe would land somewhere within the synchronization pattern and would not be able to identify the synchronization pattern as such since the beginning of the synch pattern is missed. Thus, the buffer pattern allows repositioning of the scanning probe while maintaining the scanning velocity in x-direction and nevertheless identifying the entire synchronization pattern for reading the next track identifier of the new track.

However, the read track identifier might be the last track identifier in a row of multiple track identifiers stored in a track. This is preferably detected. The information can be used as follows: Provided the derived cross track information indicates some further repositioning of the scanning probe and the track identifier is not the last one in a row of track identifiers, the relative movement between the scanning probe and the storage medium in scanning direction is maintained, since it is expected that after having repositioned the scanning probe on the new track there will still be a track identifier to be read from the new track which track identifier is arranged in scanning direction ahead of the position the scanning probe is supposed to jump on.

However, provided the derived cross track information indicates some further repositioning of the scanning probe and the track identifier is the last one in a row of track identifiers, the relative movement between the scanning probe and the storage medium in scanning direction will not be maintained during the jump in vertical direction, since it is expected that after having repositioned the scanning probe on the new track there will not be a further track on this new track ahead of the position the scanning probe is supposed to jump on. Thus, the scanning probe is settled on the beginning of this new track, requiring a reversal of the scanner from the scanning direction in order to get there. Alternatively, the scanning probe can also be repositioned on the beginning of the current track for reading now the first track identifier of the current track. A jump onto the target track can then be achieved from the current track while keeping the movement of the scanner in scanning direction.

However, in case the track identifier is identified as last track identifier in a row of track identifiers on the current track and the cross track information indicates that the current track is the target track, then the scanning probe preferably continues scanning the current track.

Other preferred embodiments deal with repositioning a scanning probe deviated within a track back on a centreline of the track. While scanning a track comprising one or more track identifiers the track scanning probe is preferably repositioned on the track centreline of the track in case deviation information shows a vertical offset of the scanning probe from the track centreline. The deviation information is preferably derived from a servo data pattern stored on the track currently scanned. In an alternative embodiment, the deviation information is derived from a servo data pattern stored on the track currently scanned and on deviation information derived from another servo data pattern stored on a track currently scanned by another scanning probe.

Preferably, the storage medium comprises at least one dedicated field comprising track identifier patterns in each track of this field. This field is particularly dedicated to support a track settling mode. Typically, such field does not comprise any user data but is exclusively reserved for operational data for operating the storage device. A field is typically defined as an area of the storage medium that is exclusively scanned by one associated scanning probe. However, according to preferred embodiments, a storage device comprises an array of scanning probes each of which scans a dedicated field of the storage medium. These scanning probes are mechanically coupled such that if the particular scanning probe scanning the field including the track identifier patterns in each track is positioned on a target track, all the other scanning probes are also positioned on this target track in their associated field. Preferably, when user data has to be written/read on/from a target track the probe scanning the track identifier field is positioned/repositioned according to the method introduced above in one or more cycles, and thus the user data scanning probe is also positioned/repositioned in the same way due to the mechanical coupling of the scanning probes. When settled then on the right track, all the scanning probes can read data in parallel from their respective user data fields.

Once the right track is identified and the scanning probe is settled on this track, the scanning probe preferably reads in the following servo data patterns arranged on each track of this field for deriving deviation information for repositioning a deviated scanning probe on a track centreline of the track and thus keeping the scanning probe on the track centreline. Through the mechanical coupling all the other scanning probes can also be kept on the track centrelines. Preferably, the track identifier patterns and the servo data patterns are arranged in the respective tracks such that that the assigned scanning probe when moved in scanning direction on a track of this dedicated field first scans one or more track identifiers in such track and then scans servo data patterns in such track.

According to another aspect of the present invention, there is provided a storage device, comprising a storage medium comprising multiple tracks, a scanning probe for scanning the storage medium, and a control unit for determining cross-track information by way of comparing a target track identifier to a track identifier read from a track the scanning probe is actually positioned on, and for positioning the scanning probe based on the cross-track information.

According to a further aspect of the present invention, there is provided a storage medium, comprising one or more tracks comprising a track identifier in form of a mark pattern identifying the respective track.

According to a fourth aspect of the present invention, there is provided a scanning device, comprising a medium to be scanned with multiple tracks, a scanning probe for scanning the medium, and a control unit for determining cross-track information by way of comparing a target track identifier to a track identifier read from a track the scanning probe is actually positioned on, and for positioning the scanning probe based on the cross-track information. Such scanning device is preferably embodied as an atomic force microscopy or any other scanning probe microscope. The medium to be scanned can be a sample that may be prepared with some tracks on some part of the sample in order to achieve appropriate scanning of the sample.

According to a fifth aspect of the present invention, there is provided a computer program element comprising computer program code means for performing a method as described above when loaded in the processor unit of a computing entity.

Any preferred embodiment of the method, apparatus, medium and associated advantages as described hereinbefore are also considered as preferred embodiments and advantages of one of the other apparatus, medium and method even if not explicitly mentioned.

BRIEF DESCRIPTION OF THE DRAWINGS

Embodiments incorporating the present invention will now be described, by way of example only, with reference to the accompanying drawings, which show.

DETAILED DESCRIPTION OF PREFERRED EMBODIMENTS

Figure 1:
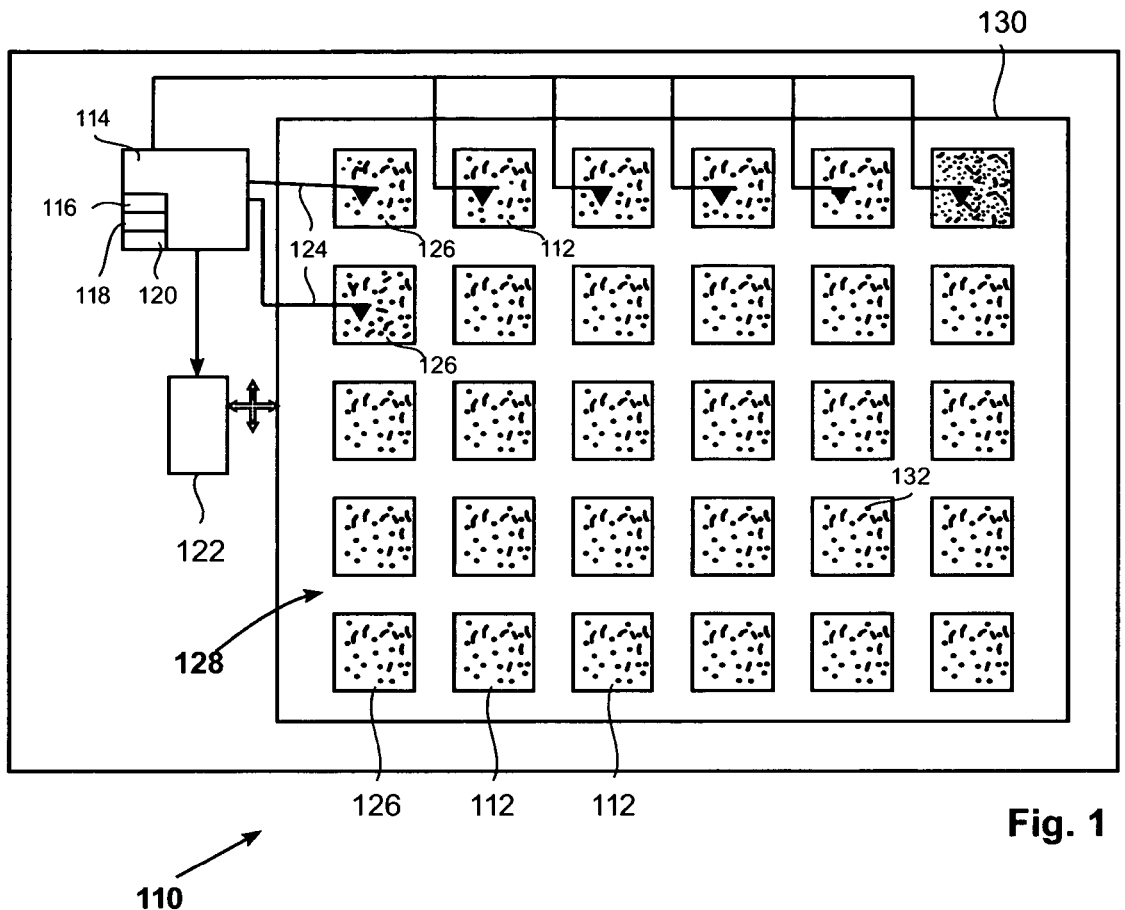
FIG. 1 shows a top view of a storage medium with a probe array system incorporating an embodiment of the present invention.

It should be emphasized that the techniques proposed in this description apply equally well to any storage device comprising an array of scanning probes. In addition to storage devices, it will be appreciated that embodiments may be implemented on any device or system that has an array of scanning probes or other transducers and a scanner. Although typically used for data storage, embodiments may be implemented in any application that requires scanner actuation. The following description is based on the storage device having a plurality of scanning probes disclosed in Vettiger 2000 and U.S. Pat. No. 5,835,477 as mentioned above for the sole purpose of illustration. Such a storage device 110 is shown in FIG. 1 of a top view of a storage medium 130 with a plurality of fields 128, for example six times five fields arranged in rows and columns. Each field comprises marks 132, and the fields include data fields 112 and operational data fields 126 which may be used to contain operational information for running the storage device 110. Operational data fields 126 are also referred to servo fields in the following. The storage device 110 has scanning probes indicated by 124, a control unit 114, and a driving mechanism 122 also referred to as scanner. Of course, the control unit 114 may be a microcomputer with respective software programs, hardware, or a combination of software programs and hardware. The control unit 114 comprises an adjusting entity 116, an amplitude identifying entity 118 and a phase determination entity 120. All of these entities 116, 118, 120 are part of the control unit 114 and may be embodied in the microcomputer mentioned above. The function of these entities are described in more detail in connection with FIG. 3.

In the following description several terms are defined. For example, "cantilever" is used interchangeably with "scanning probe", and "indentations" and "no indentations" are also referred to as "logical marks". The "gain" of the read channel is defined as the difference in magnitude between the readback signal sample obtained when the probe is exactly at an indentation center, and the sample obtained when the probe is at an indentation-free area of the storage medium, while the probe moves on a track centreline which is also referred to as TCL. The "gain" of the read channel is denoted by $\alpha$. Also, the amplitude of a readback signal is defined in the same way, even when the probe is not exactly on track, where the reference point for the measurement of the amplitude is defined as the point where the probe meets a conceptual straight line that crosses the indentation center in the cross-track direction. Therefore, since the readback signal is strongest when the probe moves on the track centreline, the maximum readback signal amplitude is equal to $\alpha$.

A storage device having a plurality of scanning probes may implement a storage technique based on a multitude of local scanning probes, each of which is capable of reading from and writing information to a part of a polymer substrate. The probes are typically arranged in rectangular two-dimensional (2D) arrays—instead of long 1D arrays—in order to reduce thermal expansion effects as discussed in Vettiger 2000.

Efficient parallel operations of large 2D arrays may be achieved by a row/column time-multiplexed addressing scheme similar to that implemented in DRAMs. In the case of a storage device having a plurality of scanning probes, the multiplexing scheme may be used to address the array column by column with full parallel write/read operation within one column Vettiger, P. et al., "The 'Millipede'—Nanotechnology Entering Data Storage," IEEE Trans. Nanotechnol., Vol. I, No. I, pp. 39-55, January 2002. (Vettiger 2002). In particular, readback signal samples are obtained by applying an electrical read pulse to the cantilevers in a column of the array, low-pass filtering the cantilever response signals, and finally sampling the filter output signals. This process is repeated sequentially until all columns of the array have been addressed, and then restarted from the first column. The time between two consecutive pulses applied to the cantilevers of the same column corresponds to the time it takes for a cantilever to move from one mark center position to the next. An alternative approach is to access all or a subset of the cantilevers simultaneously without resorting to the row/column multiplexing scheme. Clearly, the latter scheme yields higher data rates, whereas the former leads to lower implementation complexity of the channel electronics.

One of the main functions of a servo system in such a storage device is to locate the precise track where information is to be written or from which information is to be read. This is achieved by positioning procedures sometimes also called "seek" and "settle" procedures. In a first procedure, the scanning probe can rapidly be moved to a position close to the target track. In an additional procedure which is mainly subject of the present embodiment the scanning probe is moved from that or any other position on the storage medium to the target track. In a next step, the scanning probe is centered on the track centerline of the target track. A further function of the servo system is to maintain the position of the scanning probe on the target track during normal read/write operation which is known as track-follow mode.

Any positioning of the scanning probe on the target track is typically accomplished by first identifying the current cross-track position, estimating the distance to the target track, and then "jumping" towards the desired position. This process is usually repeated a few times, and terminates when the target track is located. The number of repetitions needed depends on the characteristics of the moving actuator (the x/y scanner in a storage device having a plurality of scanning probes for example), the track density, the resolution of the driving circuit, and other factors. Identification of the current cross-track position is assisted by track-identifiers—in short: track-IDs. These are special mark patterns stored on the surface of the storage medium, each of which represents a unique identification number for each track. The track-ID is detected and decoded into the number of the current track. In order to minimize detection errors due to signal loss, which may lead to erroneous position estimation, the probe should in principle be located on the current track centreline when reading a track-ID.

At the start of the process to position the scanning probe on the target track, as well as after each jump if any, several tasks are preferably performed prior to track ID detection. Specifically, the amplitude of the readback signal is estimated, and the start of the track ID pattern is reliably identified. The latter may be achieved by having each track ID pattern preceded by a special mark pattern, called a "synchronization" pattern. As typically several track IDs are read before locating the target track, for example storing a special preamble field at the left-most end of each servo field is proposed in order to assist the settle procedure. In another embodiment, the special preamble field may be located in other positions within each servo field, for example the right-most end of each field. In another embodiment the special preamble field may even be spaced apart in predetermined or regularly-spaced positions within each field. This field comprises several repetitions of synchronization patterns and track ID patterns, and has adequate length so that, with high probability, the probe will be positioned at the target track centreline at the end of the preamble. This point also signifies the termination of the positioning of the scanning probe on the target track and the start of the track follow mode, which is assisted by an all-ones pattern of marks—for PES generation—extending to the end of each servo field as discussed in Pozidis et al. With regard to the arrangement of servo fields, their content, and any other subject matter in connection with servo fields, Pozidis et al. and EP1385161A2 are incorporated by reference.

In a specific embodiment, the readback signal from a servo field is oversampled by a factor of Q with respect to the servo symbol rate.

Figure 2:
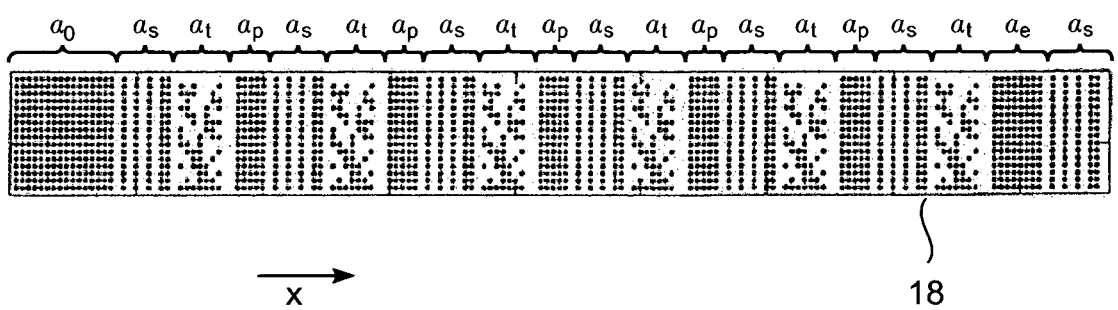
FIG. 2 shows a schematic diagram of a simulated servo field on a storage medium showing the preamble format in accordance with an embodiment of the invention.

In another preferred embodiment, the preamble for the settle mode is represented by the binary data vector:

$$a = [a_0, a_s, a_t, (a_p, a_s, a_t)^N, a_e, a_s] \tag{1}$$

where $a_0$ is a binary vector of all ones, $a_s$ is the binary sequence representing the synchronization pattern, $a_t$ is the binary sequence representing the track ID for the current track, and $a_p$ and $a_e$ are vectors of all ones, but generally of different lengths. $a_p$ is also called buffer pattern. Moreover, $(a_p, a_s, a_t)^N$ denotes a sequence of binary vectors that is repeated N times, N>=0. Each repetition of this sequence contains information which is used by the probe in order to decode the current track ID, during the probe's navigation towards the target track. Part of a conceptual servo field 18 on a storage medium showing the format of a possible implementation of the preamble is illustrated in FIG. 2, where the shaded circles 22 correspond to logical ones (indentations), and N=5. Sixteen tracks are provided in this example. A track is formed from indentations and non-indentations in a row. X denotes the scanning direction.

Generally, servo data fields on the storage medium were introduced in particular for keeping a probe on the centreline of its track, and thus keeping many or all of the other scanning probes on the track centreline of their respective tracks as well due to the mechanical coupling of the scanning probes. According to Pozidis et. al, this task is typically achieved by measuring a cross track deviation with the scanning probes assigned to servo fields and by having stored indentation marks in these servo fields in order for the assigned scanning probe to detect cross track deviation. From this cross track deviation a position error signal (PES) is derived for resetting the scanning probe on the track centreline. As the servo field is mainly determined to enable such track follow mode during writing and reading operations, the patterns used for settling a scanning probe on a target track can preferably be attached as preamble to a servo field.

Figure 3:
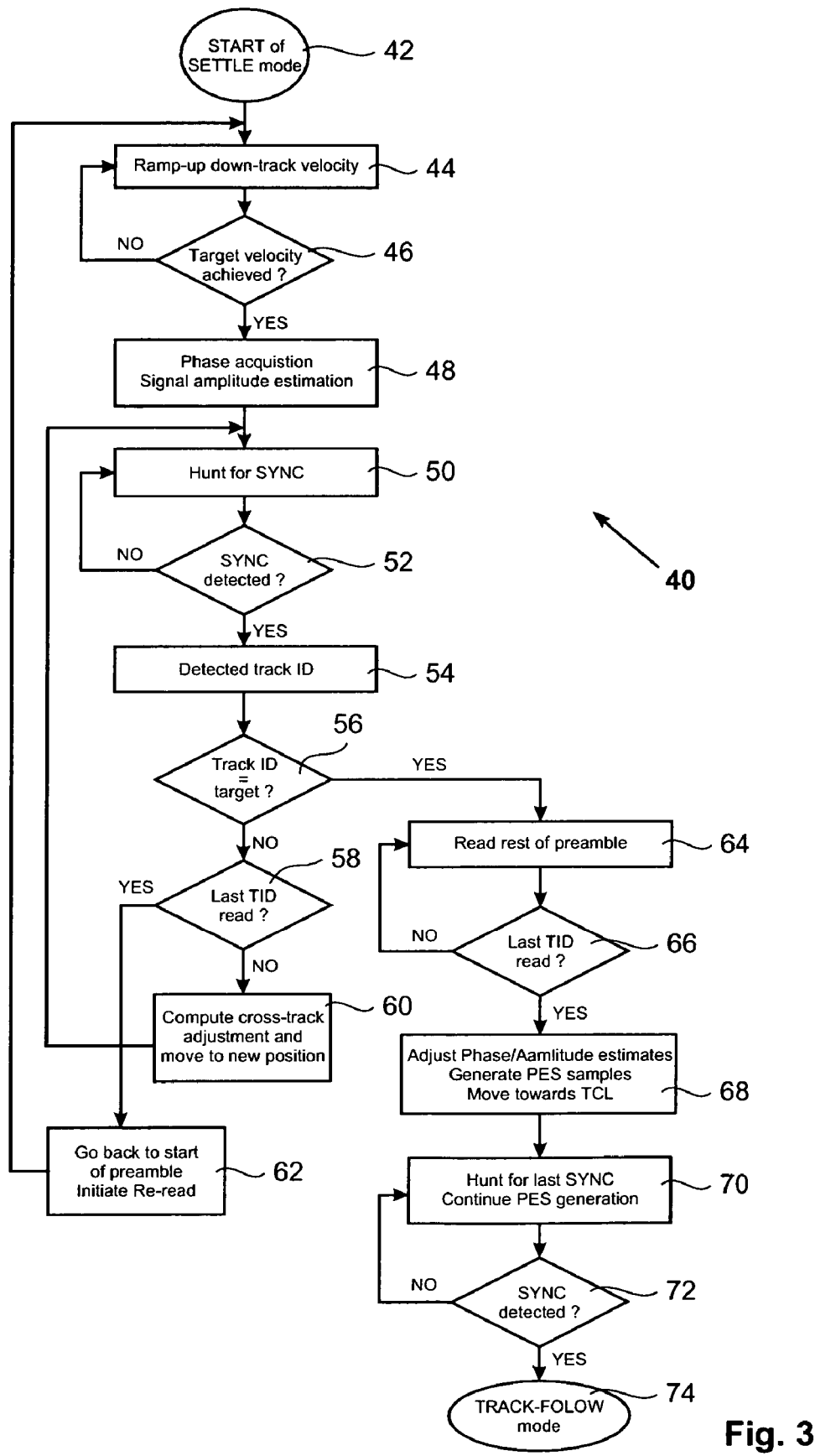
FIG. 3 shows a flowchart of operations performed during the settle mode of a method in accordance with an embodiment of the invention.

The sequence of operations that are performed during the settle mode of an embodiment is shown in the form of a flowchart, in FIG. 3. When the settle process is initiated 42, the exact down-track position of the scanning probe is not known—the exact cross-track position is also unknown, however, it is assumed that the scanning probe always lands on some track centreline after every jump. Assuming that the scanning probe lands somewhere on the stored pattern denoted by $a_0$, the readback signal samples from this pattern are used to estimate the velocity 44 of the scanner in the down-track direction, while this is increased towards a target value, and feed the estimate back to a velocity controller. Once the scanner velocity has settled to a value close to the targeted one 46, readback signals from $a_0$ are used for initial phase acquisition and signal amplitude estimation 48 of the readback signal amplitude. Following that, the start of the track ID pattern $a_t$ is identified by detecting the synchronization pattern 50,52 denoted by $a_s$.

The next step is to detect 54 the current track ID by reading the track identifier pattern $a_t$, and decode it into a relative offset from the target track which offset can be a preferred embodiment of the cross track information. If the absolute value of this offset is not less than TP/2, and if the last track ID of the preamble is not read, a diagonal jump 60 towards the target track is performed. Detecting whether a read track ID is the last track ID in a row of track IDs stored on the track can be supported e.g. by a flag in form of an indentation/non-indentation within the track identifier pattern and in any other suitable way. Once the probe has "landed" on the new track, and since the probe's new position is not known exactly, the procedure described above is repeated in order to identify the current location. If the last track ID or offset in the preamble is read, the above is repeated to go back to start of preamble and initiate a re-read 62. The role of the patterns denoted by $a_s$, $a_t$ is therefore un-changed, while $a_p$, like $a_0$ is used for phase acquisition and, possibly, amplitude estimation. Once the desired track is located, the probe needs only to "read" through the rest of the preamble 64 until the end of the last track ID pattern 66. The all-ones pattern $a_e$ that follows is meant to be used for the generation of PES samples and thus fulfils the function of a servo data pattern, to guide the probe towards the TCL 68 of the target track. For example the phase/amplitude estimates may be adjusted to generate the PES samples and move towards the TCL during reading the servo data pattern $a_e$. The servo data pattern $a_e$ might comprise indentation deviated from the track centreline in order to generate the PES. For further details it is referred to Pozidis et al. The last synchronization pattern 70 serves for detecting the end of the preamble, which also determines the end of the settle mode, and the start of the all-ones pattern used for track following. If the synchronization is not detected, the hunt for last synchronization is repeated while continuing PES generation, until the last synchronization is detected 72, which signals the start of the track-follow mode 74.

An alternative to having preambles at each servo field to assist the settle mode, is to have entire fields (at least four, according to the adopted configuration) storing similar information. These fields have the same format as the settle preamble, except that the sequence ($a_p$, $a_s$, $a_t$) is repeated many times, to cover the entire width of the field, or at least a significant part of the field. This is to increase the probability that the target track will be located before the preamble ends, so that returning to the start of the field to re-read track IDs will not be needed. This alternative configuration requires up to twice the amount of storage overhead for servo, but it may prove useful, depending on the characteristics of the moving actuator in the storage device.

It will be understood that the method and arrangement for settling on a target track in a storage device comprising a scanning probe described above provides the advantages of fast and accurate settling on a target track, of the overall robustness of the servo system, and of reducing the execution time of the settle mode. It will be appreciated that specific embodiments of the invention are discussed for illustrative purposes, and various modifications may be made without departing from the scope of the invention as defined by the appended claims.

The invention claimed is:

1. A method for positioning a scanning probe on a target track of a multi-track storage medium, the method comprising:
    using a plurality of data field probes to simultaneously scan tracks in a plurality of distinct data fields disposed on the storage medium;
    using a servo field probe mechanically coupled to the plurality of data field probes to scan tracks in a servo field simultaneously with the data field scans, the servo field separate from the data fields;
    reading a current track on which the servo field probe is currently positioned, the current track disposed in the servo field comprising a plurality of tracks, each track comprising a binary data vector, each binary data vector comprising a plurality of repetitions of a binary sequence representing a synchronization pattern, a plurality of repetitions of a unique binary sequence representing a track identification for the track containing that binary data vector and a plurality of repetitions of a buffer pattern, each repetition of the track identification in the binary data vector preceded by the synchronization pattern;
    determining cross-track information by comparing a target track identifier to the track identification for the current track;
    positioning the servo field probe based on the cross-track information; and
    using the mechanical coupling between the servo field probe and the plurality of data field probes to position the plurality of data field probes on data field tracks corresponding to the positioning of the servo field probe of the servo field tracks.

2. The method according to claim 1, further comprising using the synchronization patterns in the current track to identify the beginning of the track identification.

3. The method according to claim 1, further comprising adjusting velocity of the servo field probe to a desired velocity prior to reading the track identifiers in the binary data vector on the current track.

4. The method according to claim 1, further comprising identifying an amplitude of a signal received when reading the sequence of binary data vectors prior to reading the track identifiers in the binary data vector of the current track.

5. The method according to claim 1, further comprising:
providing electrical pulses for at least one of reading, writing and erasing information; and
determining a phase of the electrical pulses prior to reading the binary data vector.

6. The method according to claim 1, wherein the step of positioning die servo field probe further comprises keeping the servo field probe on the current track when the cross track information does not indicate a jump to another track of the storage medium.

7. The method according to claim 1, wherein the step of positioning the servo field probe further comprises positioning the servo field probe on another track than the current track when the cross track information indicates such repositioning.

8. The method according to claim 1, further comprising detecting if the binary sequence representing the track identification is a last binary sequence representing a track identification in the plurality of repetitions of the track identification.

9. The method according to claim 1, further comprising: positioning the servo field probe on another track than the current track in case the cross track information indicates such positioning, by moving the servo field probe vertically to a scanning direction while keeping the relative movement between the servo field probe and the storage medium in scanning direction.

10. The method according to claim 1, further comprising:
positioning the servo field probe on another track than the current track in case the cross track information indicates such repositioning; and
maintaining the relative movement between the servo field probe and the storage medium in scanning direction only if the binary sequence representing the track identification is not a last binary sequence representing a track identification in the plurality of repetitions of the track identification.

11. The method according to claim 1, further comprising in case the cross track information indicates a positioning of the servo field probe on another track settling the servo field probe on the beginning of the other track if the binary sequence representing the track identification is a last binary sequence representing a track identification in a plurality of sequences of binary vectors stored in the current track.

12. The method according to claim 1, further comprising in case the cross track information indicates a positioning of the servo field probe on another track settling the servo field probe at a beginning of the binary data vector in the current track if the binary sequence representing the track identification is a last binary sequence representing a track identification in the plurality of repetitions of the track identification stored in the current track.

13. The method according to claim 1, further comprising while scanning the current track comprising the binary data vector repositioning the servo field probe on a track centreline of the current track in case deviation information shows a vertical offset of the servo field probe from the track centreline.

14. The method according to claim 13, wherein the repositioning of the servo field probe on the track centreline is based exclusively on deviation information derived from a servo data pattern contained in the binary data vector.

15. The method according to claim 13, wherein the repositioning of the servo field probe on the track centreline is based on deviation information derived from a servo data pattern contained in the binary data vector stored on the current track and on deviation information derived from another servo data pattern contained in a binary data vector stored on another track currently scanned by another servo field probe.

16. A storage device, comprising:
a storage medium comprising a plurality of fields, each field comprising multiple tracks, the fields comprising data fields and a servo field, each track in the servo field comprising a binary data vector comprising a plurality of repetitions of a binary sequence representing a synchronization pattern, the synchronization pattern common to all binary data vectors on all tracks, a plurality of repetitions of a unique binary sequence representing a track identification for the track containing the binary data vector and a plurality of repetitions of a buffer pattern common to all binary data vectors on all tracks, each repetition of the track identification in the binary data vector preceded by the synchronization pattern;
a plurality of data field probes to scan tracks in the data fields simultaneously;
a servo field probe for scanning the tracks in the servo field, the servo field probe mechanically coupled to the plurality of data field probes such that motion of the servo field probe translates into corresponding motion in the plurality of data field probes; and
a control unit designed for determining cross-track information by way of comparing a target track identification to a track identification read from a current track the scanning probe is currently positioned on, and for positioning the servo field probe based on the cross-track information.

17. The storage device according to claim 16, further comprising an adjuster for adjusting a velocity of the servo field probe to a desired velocity.

18. The storage device according to claim 16, further comprising an amplitude identifier for identifying an amplitude of a read back signal received when reading the binary data vectors.

19. The storage device according to claim 16, further comprising a phase evaluator for determining a phase of pulses, which are provided for at least one of reading, writing and erasing.

20. The storage device according to claim 16, wherein the servo field comprises a servo data pattern for deriving deviation information for repositioning a deviated servo field probe on a track centreline of the track.

21. The storage device according to claim 20, wherein the synchronization patterns, track identifiers and the servo data pattern are arranged in each binary data vector such that that the assigned servo data probe when moved in scanning direction on a track of the servo field scans the synchronization patterns and track identifiers in such track first and then scans servo data pattern in such track.

22. A computer program element comprising computer program code for causing steps of:
using a plurality of data field probes to simultaneously scan tracks in a plurality of distinct data fields disposed on the storage medium;

using a servo field probe mechanically coupled to the plurality of data field probes to scan tracks in a servo field simultaneously with the data field scans, the servo field separate from the data fields;

reading a current track on which the servo field probe is currently positioned, the current track disposed in the servo field comprising a plurality of tracks, each track comprising a binary data vector, each binary data vector comprising a plurality of repetitions of a binary sequence representing a synchronization pattern, a plurality of repetitions of a unique binary sequence representing a track identification for the track containing that binary data vector and a plurality of repetitions of a buffer pattern, each repetition of the track identification in the binary data vector preceded by the synchronization pattern;

determining cross-track information by comparing a target track identifier to the track identification for the current track;

positioning the servo field probe based on the cross-track information; and using the mechanical coupling between the servo field probe and the plurality of data field probes to position the plurality of data field probes on data field tracks corresponding to the positioning of the servo field probe of the servo field tracks;

to be performed when loaded in the processor unit of a computing entity.

* * * * *